Nov. 2, 1926.
H. V. LUDWICK
WHEEL
Filed August 1, 1922
1,605,360
2 Sheets-Sheet 2
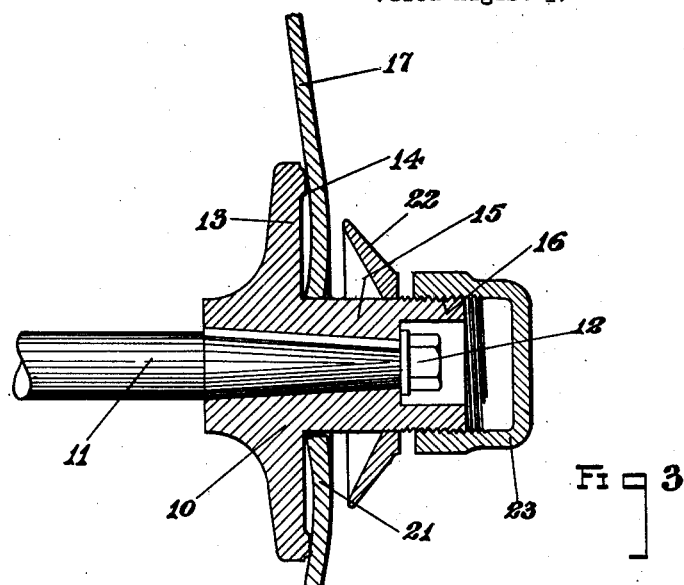
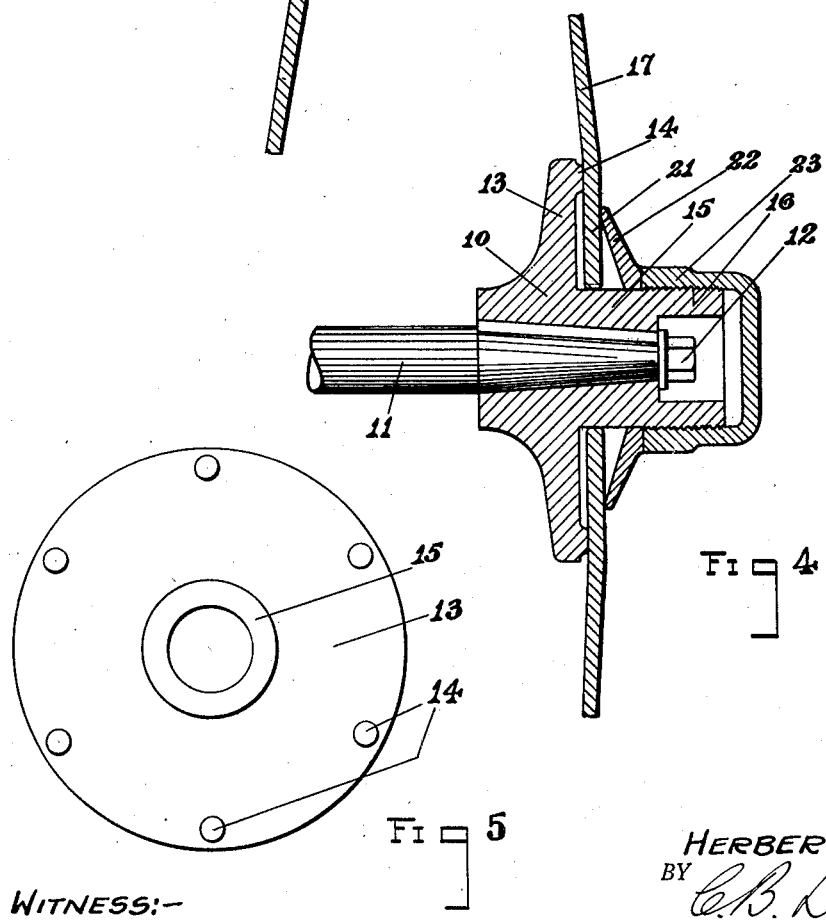
INVENTOR.
HERBERT V. LUDWICK
BY
ATTORNEYS.
WITNESS:-

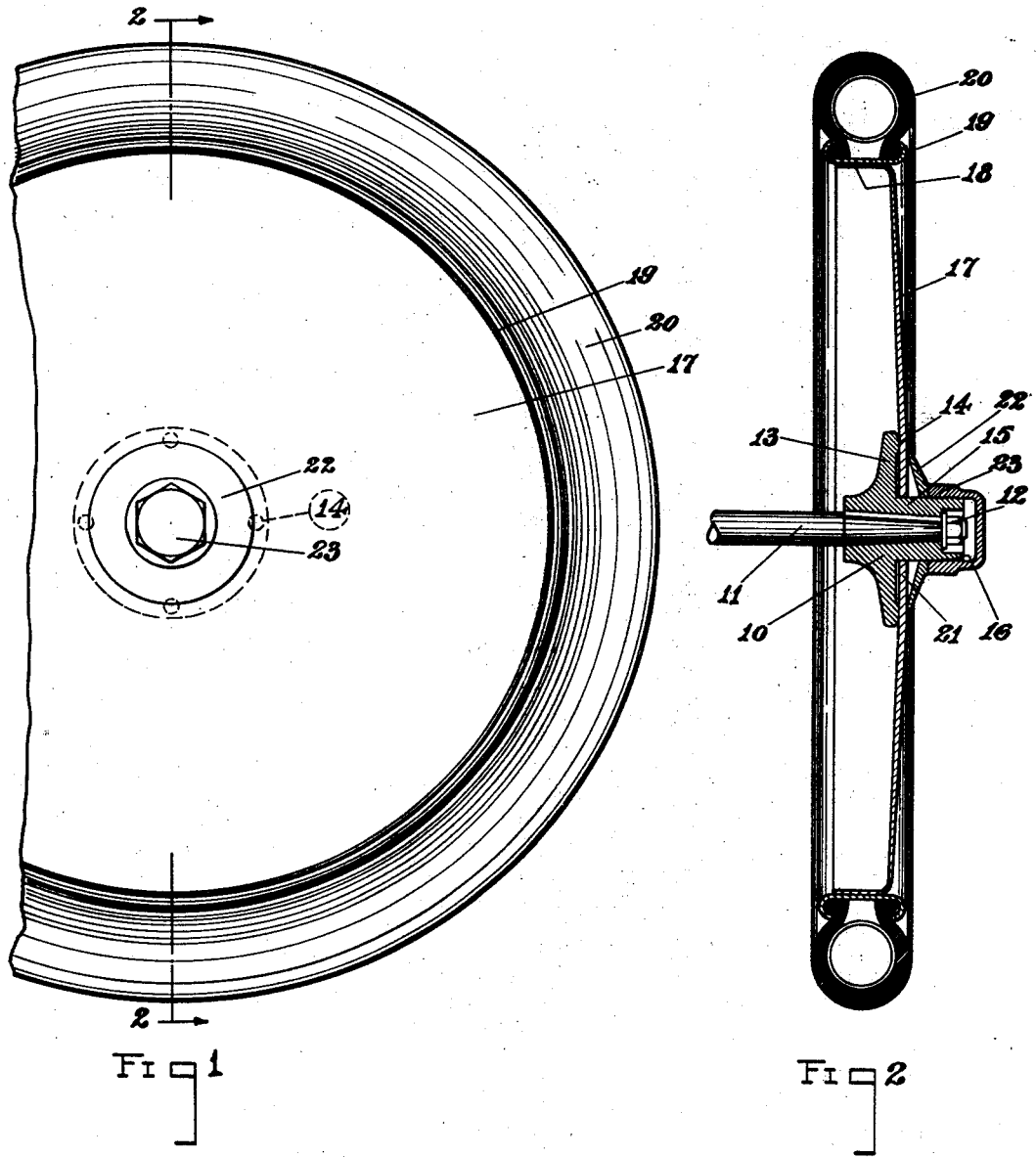

Patented Nov. 2, 1926.

1,605,360

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

WHEEL.

Application filed August 1, 1922. Serial No. 578,900.

My invention relates to improvements in wheels and has to do, more particularly, with demountable disc wheels for automobiles.

The main object of my invention is to provide simple and inexpensive means for effecting a driving connection between the hub and wheel disc of a demountable disc wheel.

A further object of my invention is to provide a demountable disc wheel construction in which portions of the disc are so formed as to cooperate with portions of the flange with a clutch action to secure the wheel disc on the hub.

Another object of my invention is to provide a demountable disc wheel construction in which portions of the hub, disc and securing means coact as elements of a clutch connecting the wheel disc to the hub.

Further objects, and objects relating to details and economies of operation and construction, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

Fig. 1 is a fragmentary view in elevation of a wheel embodying my invention.

Fig. 2 is a sectional view through the wheel taken on line 2—2 of Fig. 1.

Fig. 3 is an enlarged sectional view through the central portion of the wheel showing the parts in their unstressed state before the hub cap is screwed up.

Fig. 4 is a similar view showing the parts in their stressed state after the hub cap has been screwed up, and Fig. 5 is an end view of the wheel hub.

In the drawings, the same reference numerals refer to the same parts throughout the several views and the sectional views are taken looking in the direction of the arrows at the ends of the section lines.

Demountable disc wheels usually comprise a hub, which is mounted on the automobile, a wheel disc adapted to carry a rim and tire, and releasable means for effecting a driving connection between the hub and disc so that driving torque will be transmitted from the hub to the disc. Heretofore, the means for connecting the disc to the hub have added considerably to the cost and weight of the demountable disc wheel construction. It is the purpose of my present invention to provide a connection between the hub and disc of a demountable disc wheel which is especially simple and effective so that the weight and cost of the wheel may be kept low, while, at the same time, the connection between hub and disc is such that it may be quickly and easily released but secures the two parts firmly together so as to transmit driving torque from one to the other. I propose to form the central portion of the disc so that it cooperates in a clutch action with the flange on the hub. I may form the central opening therein, with a curvature so that it contacts with the hub flange near the periphery thereof and is arched away from the body of the flange. I propose to provide an annular member mounted on the hub and forced toward the disc so as to engage the arched portion thereof tending to flatten it out. This annular member may be a dished washer which also tends to flatten out when forced against the disc, so that both the disc and washer are stressed when the disc is clamped in position.

The wheel illustrated in the drawings as one embodiment of my invention consists of a hub, 10, which is fastened to the axle shaft, 11 by key and nut, 12, in the usual manner. The hub, 10, has a radial flange, 13, provided with a plurality of bosses, 14, positioned near the periphery of the flange on the outer face thereof. The hub also has a cylindrical shoulder, 15, at the base of the flange, 13, and the outer end of the shoulder is externally threaded, at 16, to receive the hub cap. The wheel disc, 17, has a peripheral flange, 18, to which the rim, 19, carrying tire, 20, is secured. The wheel disc, 17, has a central opening therein through which the shoulder, 15, extends and that portion, 21, of the disc adjacent the central opening is so formed as to have a cross-section, such as shown in Fig. 3. When the disc is mounted on the hub in its free or unstressed state, it contacts with the flange, 13, at the bosses, 14, and also at points near the base of the flange. The central portion, 21, of the disc is so formed that, in its free state, it is arched away from the flange, 13, between such points of contact. A dished washer, 22, is mounted on the shoulder, 15, and the periphery of this washer engages that portion, 21, of the disc which is arched away from the flange. The washer, 22, is forced toward the disc to clamp the disc to the hub by the nut or hub cap, 23, screwed on the threaded end, 16, of the hub.

Fig. 3 shows the parts in their free or unstressed state and it will be noted that the portion, 21, of the disc, 17, contacts with flange, 13, near the base of the flange and also, at the bosses, 14, near the periphery of the flange. When the hub cap, 23, is screwed up it forces the dished washer, 22, toward the disc until the periphery of the washer contacts with the portion, 21, of the disc at points nearer the axis of the hub than the bosses, 14. As the hub cap is screwed up, the pressure applied by washer, 22, tends to flatten out the arched portion, 21, of the disc, putting it under stress and bringing it substantially to the form shown in Fig. 4. The flattening out of the portion, 21, of the disc, also causes the edge of the central opening in the disc to grip the shoulder, 15, of the hub. The dished washer, 22, also tends to flatten out and is stressed and the washer, 22, disc, 17, and flange, 13, together with hub cap, 23, cooperate like the elements of a plate clutch to couple the disc to the hub. The washer, 22, and portion, 21, of the disc are both put under stress and exert a pressure, after the manner of a spring washer, on the hub cap, tending to keep it from unscrewing. The wheel disc, 17, can be removed to change wheels by removing the hub cap, 23, and washer, 22. The hub is of very simple construction with practically no machining operations necessary on it. Thus I am enabled to make a very cheap and light demountable disc wheel.

I am aware that the particular wheel construction illustrated herein may be changed considerably without departing from the spirit of my invention and, therefore, I claim my invention broadly, as indicated by the appended claims.

Having thus described my invention, what I claim as new and useful and desire to secure by Letters Patent is:—

1. In a wheel, the combination of a hub having a radial flange, a disc mounted on said hub and having its central portion so formed as to contact with said flange in two radially-spaced zones of contact when unstressed, and an annular member mounted on the hub and engaging the disc between said zones of contact to clamp the disc to the hub under stress.

2. In a wheel, the combination of a hub having a radial flange, a disc mounted on said hub and so formed as to normally contact with said flange near the edge thereof, the disc being arched away from inner portion in an annular zone of the flange, and a unitary means engaging such arched portions to force the disc toward the flange to frictionally clamp the disc on the hub.

3. In a wheel the combination of a hub having a radial flange, a wheel disc forming the body of the wheel mounted on said hub and so formed as to normally contact with said flange near the edge thereof, the disc being arched away from inner portions of the flange, an annular member mounted on the hub and engaging the arched portions of the disc, and means engaging said annular member and forcing it toward the disc to frictionally clamp the disc on the hub.

4. In a wheel, the combination of a hub having a radial flange, a wheel disc mounted on said hub and so formed as to normally contact with said flange near the edge thereof, the disc being arched away from inner portions of the flange, a spring washer mounted on said hub and engaging the arched portions of said disc, and means engaging said washer to force it toward the disc.

5. In a wheel, the combination of a hub having a radial flange, said flange being provided with a plurality of bosses near the periphery thereof, a wheel disc mounted on said hub and normally contacting with said bosses, said disc being arched away from inner portions of the flange, and means for resiliently clamping said disc against the bosses on the flange to frictionally secure the disc and hub against relative rotation.

6. In a wheel, the combination of a hub having a radial flange, a wheel disc mounted on said hub and so formed as to normally contact with said flange near one edge thereof, the disc being arched away from the inner portion of the flange, and means tending to flatten said arched portion to place it under stress whereby to frictionally couple said disc to said hub.

In testimony whereof, I affix my signature.

HERBERT V. LUDWICK.